(12) United States Patent  
Stout et al.

(10) Patent No.: US 10,083,419 B2  
(45) Date of Patent: *Sep. 25, 2018

(54) BARCODE SCANNER DEVICE AND INVENTORY MANAGEMENT SYSTEM

(71) Applicant: ASDA STORES LIMITED, Leeds (GB)

(72) Inventors: Philip Alexander Stout, Atherton (GB); Michael Patrick Amos, Harrogate (GB)

(73) Assignee: ASDA STORES LIMITED, Leeds (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,387

(22) Filed: Nov. 14, 2017

(65) Prior Publication Data

US 2018/0068264 A1 Mar. 8, 2018

Related U.S. Application Data

(63) Continuation of application No. 15/153,486, filed on May 12, 2016, now Pat. No. 9,846,857.

(30) Foreign Application Priority Data

May 13, 2015 (GB) .................................. 1508122.7

(51) Int. Cl.
*G06K 7/10* (2006.01)
*G06Q 10/08* (2012.01)
(Continued)

(52) U.S. Cl.
CPC .......... *G06Q 10/087* (2013.01); *G06F 1/163* (2013.01); *G06K 7/10732* (2013.01);
(Continued)

(58) Field of Classification Search
CPC ....................................... G06K 7/10881–7/109
See application file for complete search history.

(56) References Cited

U.S. PATENT DOCUMENTS 5,430,283 A 7/1995 Tanaka
5,945,661 A 8/1999 Nukui
(Continued)

FOREIGN PATENT DOCUMENTS

EP 1050793 11/2000

OTHER PUBLICATIONS

U.S. Appl. No. 15/153,486; Office Action dated Mar. 21, 2017.
(Continued)

*Primary Examiner* — Christle I Marshall
(74) *Attorney, Agent, or Firm* — Fitch, Even, Tabin & Flannery LLP

(57) ABSTRACT

A barcode scanner device 200 is formed as a wrist watch with a main body 210 and strap 220 and includes a camera 211 to capture an image of a barcode 11. The scanner 200 generates an inventory request message sent by a communication interface 215 to a local server 30 based on the captured barcode. In a capture mode, live camera images may be displayed on touch-screen display 212 while capturing the barcode with guides and feedback for the user. In a display mode, inventory data from database 32 may be accessed in a large data field on the touch screen display 212.

20 Claims, 6 Drawing Sheets

(51) Int. Cl.
*G07G 1/00* (2006.01)
*G06F 1/16* (2006.01)
*G06K 19/06* (2006.01)
*G06K 7/14* (2006.01)
*G06K 17/00* (2006.01)

(52) U.S. Cl.
CPC ..... *G06K 7/10881* (2013.01); *G06K 7/10891* (2013.01); *G06K 7/1447* (2013.01); *G06K 17/0022* (2013.01); *G06K 19/06028* (2013.01); *G07G 1/0045* (2013.01); *G06K 2007/10534* (2013.01); *G06K 2017/0051* (2013.01)

(56) References Cited

U.S. PATENT DOCUMENTS

| | | | | |
|---|---|---|---|---|
| 6,343,276 | B1* | 1/2002 | Barnett | G06Q 10/087 705/28 |
| 8,498,960 | B2* | 7/2013 | Pacella | G06F 17/30442 705/22 |
| 8,674,810 | B2* | 3/2014 | Uysal | G06K 7/0008 340/10.4 |
| 2004/0251307 | A1* | 12/2004 | Schmidt | B82Y 15/00 235/462.46 |
| 2011/0314038 | A1* | 12/2011 | Pacella | G06F 17/30442 707/766 |
| 2014/0156412 | A1* | 6/2014 | Tse | G06K 9/00671 705/14.58 |
| 2014/0180572 | A1 | 6/2014 | Acker | |
| 2014/0249944 | A1* | 9/2014 | Hicks | G06K 7/10891 705/17 |
| 2015/0015502 | A1* | 1/2015 | Al-Nasser | G04G 17/08 345/173 |
| 2015/0100445 | A1 | 4/2015 | Johnson | |
| 2015/0229750 | A1* | 8/2015 | Zhou | H04M 1/72522 705/44 |
| 2015/0288682 | A1* | 10/2015 | Bisroev | G06F 3/0481 713/172 |
| 2016/0267310 | A1* | 9/2016 | AlNasser | G06K 7/10009 |
| 2016/0283765 | A1* | 9/2016 | Sandtner | G06K 7/1439 |

OTHER PUBLICATIONS

U.S. Appl. No. 15/153,486; Notice of Allowance dated Aug. 15, 2017.
IPO; App. No. GB1508122.7; Search Report dated Oct. 22, 2015; 1 page.
UKIPO; App. No. 1508122.7; Second Examination Report dated Oct. 13, 2016.
USPTO; U.S. Appl. No. 15/153,486; Office Action dated Mar. 21, 2017.
USPTO; U.S. Appl. No. 15/153,486; Notice of Allowance dated Aug. 15, 2017; (pp. 1-7).

* cited by examiner

BARCODE SCANNER DEVICE AND INVENTORY MANAGEMENT SYSTEM

CROSS-REFERENCE TO RELATED APPLICATIONS

This application is a continuation of U.S. application Ser. No. 15/153,486, filed 12 May 2016, which claims priority under 35 U.S.C. § 119 to application number 1508122.7 filed on 13 May 2015 in United Kingdom, which are incorporated herein by reference in their entirety.

FIELD

The present application relates generally to the field of devices for scanning barcodes, as may be used, for example, in an inventory management system for retail stores.

BACKGROUND

Modern retail stores sell a wide variety of items, including foodstuffs, home and kitchen goods, electronic goods, clothing, sporting goods and so on. Typically the items are displayed on shelves or other display units to be selected by customers and taken to a point of sale or checkout to be purchased. The display units are then replenished with new stock by staff of the retail store, which is delivered to the store via a supply chain or held in reserve at the store. Hence, there is an ongoing need to manage the inventory of a retail store.

Typically, each product item is marked with a barcode. The barcode is a machine readable physical marking on the item or attached to the item, e.g. as a label, forming a one dimensional (1D) or two-dimensional (2D) pattern. The barcode provides identity data about the item, most often in the form of a Universal Product Code (UPC).

A barcode scanner is used by staff in the retail store to read the barcode and then obtain information about the product item, such as by communicating over a wireless local network with a product database hosted by a store server. However, many different challenges arise in relation to the barcode scanner. The barcode scanner is typically a dedicated device with a relatively large form factor and a relatively high cost. A 'gun' form factor is widely used, with the scanner carried in a waist-worn holster. The user may grip the gun-type scanner and control a scanning function using a trigger. Each retail store only has a limited number of barcode scanners, and each day the barcode scanners are carried around the store by staff. However, the scanners can be lost or misplaced, or are simply unavailable when needed to fulfil a particular duty such as responding to a customer question concerning the store inventory.

Further issues arise such as the operation and effectiveness of the barcode scanner. For example, there are challenges concerning the response speed of the scanner. Further, the scanner typically has a bespoke user interface and requires a skilled operator. Store staff are often unable to effectively use all of the potential functionality of the barcode scanner, due to the high level of knowledge and skill required.

One aim is to address at least some of the above difficulties, or other difficulties as will be appreciated from the description herein. Some examples described herein may aim to provide a more convenient and cost effective barcode scanning device. Some examples may aim to provide a barcode scanning device which has improved functionality and ease of use.

SUMMARY

According to the present invention there is provided a barcode scanner device and an inventory management system as set forth in the appended claims. Additional features will be apparent from the dependent claims, and the description which follows.

In one example there is described a barcode scanner device which includes a camera to capture an image of a barcode and generate a respective inventory request message sent by a communication interface to a local server. The scanner is formed as a wrist watch or smart watch with a main body and strap. In a capture mode, live camera images may be displayed while capturing the barcode with guides and feedback for the user. In a display mode, inventory data from a product inventory database may be accessed in a large data field by scrolling actions on a touch screen display.

In one example there is described a barcode scanner, comprising a main body including a camera to capture an image of a barcode, a processor to process the image and decode a payload of the barcode, and a communication interface to send an inventory request message based on the payload of the barcode and to receive inventory data in response thereto; and a strap arranged to secure the main body in use to a wrist of a user; wherein the barcode scanner is operable to scan the barcode while secured to the user's wrist by the strap.

In one example, the scanner is formed as a wrist watch.

In one example, the main body further comprises a touch-screen display which both displays information on a display screen and receives a user input by touching the display screen.

In one example, the processor is arranged to decode a product identity code in the payload of the barcode by processing the image captured by the camera, and the communication unit is arranged to send an inventory request message containing the product identity code to a server over a wireless communication channel and receive in response an inventory data message comprising the inventory data relevant to the product identity code.

In one example, the inventory request message comprises one or more fields selected from the group comprising: an authorisation token which confirms that the scanner device is authorised to make the request; the product identity code derived from the barcode; a user identity of a member of staff who currently uses the scanner, and a location identity associating the scanner with a particular retail store.

In one example, the scanner is arranged to determine a current geographical location of the scanner and to set the location identity of the scanner according to the determined current geographical location.

In one example, the scanner is arranged to display on the display screen the inventory data received in the inventory data message, and to receive a user input relevant to the displayed inventory data by touching the display screen.

In one example, the scanner is arranged to display a home screen while at rest and to transition to a scanning mode in response to selecting a scanner function on the home screen.

In one example, the scanner is arranged to display in a region of the display screen a live camera image as captured by the camera to aid orientation of the scanner by the user.

In one example, the scanner is arranged to provide a visible indication to the user that capture of the barcode is possible from the live camera image displayed on the display screen.

In one example, the scanner is arranged to display a guide portion on the display screen to guide a correct orientation and position the scanner in relation to the barcode.

In one example, the scanner is arranged to trigger processing of the barcode in the camera image in response to a user touch input on the display screen.

In one example, the scanner is arranged to capture and store a plurality of camera images from the camera to be processed at a later time.

In one example, the scanner further comprises a display screen arranged to display inventory data related to the barcode, wherein the display screen provides an active display window and the inventory data is arranged in a data field extending beyond the active display window.

In one example, the data field of the inventory data extends beyond the active display window horizontally and/or vertically and the scanner is arranged to access the inventory data by scrolling the active display window over the data field.

In one example, the data field is divided into a plurality of adjacent sub-regions each approximate in size to the active display window wherein the scanner is operable to transition between a first one of said sub-regions and an adjacent second one of said sub-region by scrolling the active display window.

In one example, the data field defines one or more user selectable regions which when present in the active display window and activated by the user cause the display screen to enter a user input mode in which the user can actively enter data into the displayed field.

In one example there is described an inventory management system for managing inventory in a retail store, comprising: a local server device coupled a product inventory data storage device containing inventory data related to a plurality of product items; a local communication interface for wireless communication with the local server device; and a barcode scanner device comprising a main body and a strap to secure the main body in use to a wrist of a user, the barcode scanner device including a camera to capture an image of a barcode on a product item, a communication interface to send an inventory request message based on the barcode to the local server device and to receive inventory data in response thereto, and a touch-screen display to display the received inventory data while receiving user touch inputs.

In one example, the barcode scanner device is formed as a wrist watch.

In one example, the local server device is coupled to a computer network to exchange updates of the product inventory data held in the product inventory data storage device.

In one example there is provided a tangible non-transient computer readable medium having instructions recorded thereon which when executed by a wrist-worn computer device perform any of the methods described herein.

BRIEF DESCRIPTION OF DRAWINGS

For a better understanding and to show how example embodiments may be carried into effect, reference will now be made to the accompanying drawings in which.

Figure 1:
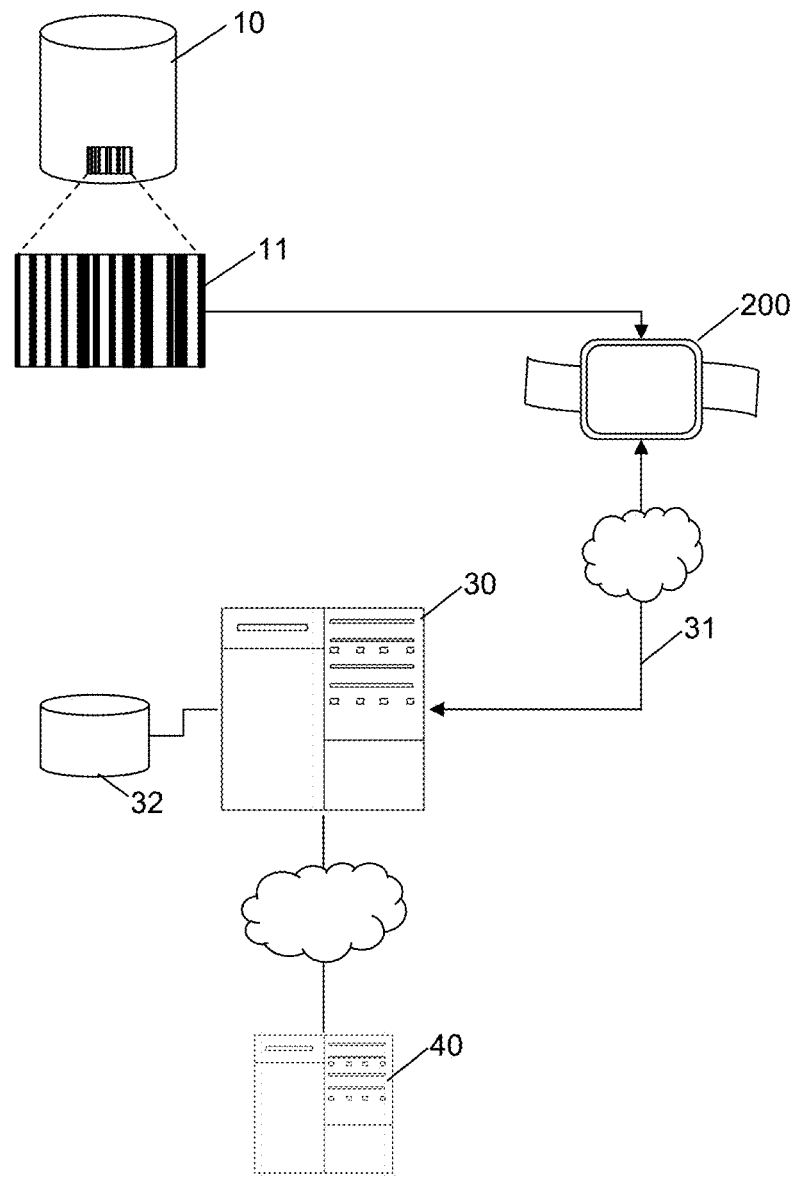
FIG. 1 is a schematic view of an inventory control system using a barcode scanner.

In the drawings, corresponding reference characters indicate corresponding components. The skilled person will appreciate that elements in the drawings are illustrated for simplicity and clarity and have not necessarily been drawn to scale. For example, the dimensions of some of the elements may be exaggerated relative to other elements to help to improve understanding of various example embodiments. Also, some common and well-understood elements that are useful or necessary in a commercially feasible embodiment are often not depicted in order to facilitate a less obstructed view of these various example embodiments.

DESCRIPTION OF EMBODIMENTS

At least some of the following examples show an inventory management system and barcode scanner which are suitable for use in a network of retail stores. Many other advantages and improvements will be discussed in more detail below, or will be appreciated by the skilled person from carrying out example embodiments based on the teachings herein. The example embodiments have been described particularly in relation to a retail store such as a supermarket or general store for grocery and household items. However, it will be appreciated that the example embodiments may be applied in many other specific environments.

FIG. 1 is a schematic view of an example inventory control system in which a barcode scanner 200 may be employed. Barcodes are a well-established mechanism for automatically identifying and capturing machine-readable data into a computer system. Each physical inventory item 10 (e.g. a packet of biscuits or a tin of beans) displays a barcode label 11 with machine-readable visible physical markings. The barcode label 11 may have a 1D or 2D pattern of geometric shapes, such as parallel lines, rectangles, dots, hexagons or other variations, and is typically affixed to the product or incorporated within the packaging of the product. As an example, retail products typically use barcodes which confirm to the 'UPC-A' standard, although other standards are also known such as the International/European Article Number (EAN), Japanese Article Numbers (JAN) or Global Trade Item Numbers (GTIN) as the payload of the barcode pattern. Barcode labels are attractive for retail products in a supermarket, due to their cost-effective, robust and widespread implementation. Barcodes may be use alongside other types of identification such as radio frequency identification (RFID), magnetic stripes, optical character recognition and so on.

An example barcode scanner device 200 is illustrated schematically in FIG. 1, also known as a barcode scanner or barcode reader. The barcode scanner 200 functions to read the barcode label 11 though an optical image sensor such as a camera (e.g. a charge coupled device CCD). The optical image is processed by the device 200 in order to identify the barcode and extract payload data from the barcode, such as a product identity number conforming to UPC-A or similar.

In this example, the barcode scanner 200 has a form factor of a wrist watch or smart watch. As shown in FIG. 1, the smart-watch barcode scanner device 200 in use may communicate over a local communication link 31 with a local server device 30 to access a product inventory database 32. The database 32 may be held on a physical database storage device which is coupled to and accessible by the local server 30 in use. In this way, the barcode scanner 200 may present product identity data obtained from the payload of the barcode label 11 to the server 30, and in return receive product inventory data from the inventory database 32. The local server 30 may be connected to a server network 40, which for example may link together many different retail stores and head office sites of a particular retailer.

Typically, each retail store carries many thousands of individual product lines and thus has a large, complex and fast-changing inventory. Regular updates may be performed in order to pass inventory data between each store and the head office, and to receive new inventory data into the local inventory database 32 which is accessible to the scanner devices 200 in each particular retail store or location. Thus, the inventory data changes frequently and there is a need for store staff to be able to quickly and conveniently access the current inventory data FIG. 2 is a schematic diagram showing the scanner device 200 in more detail.

Figure 2:
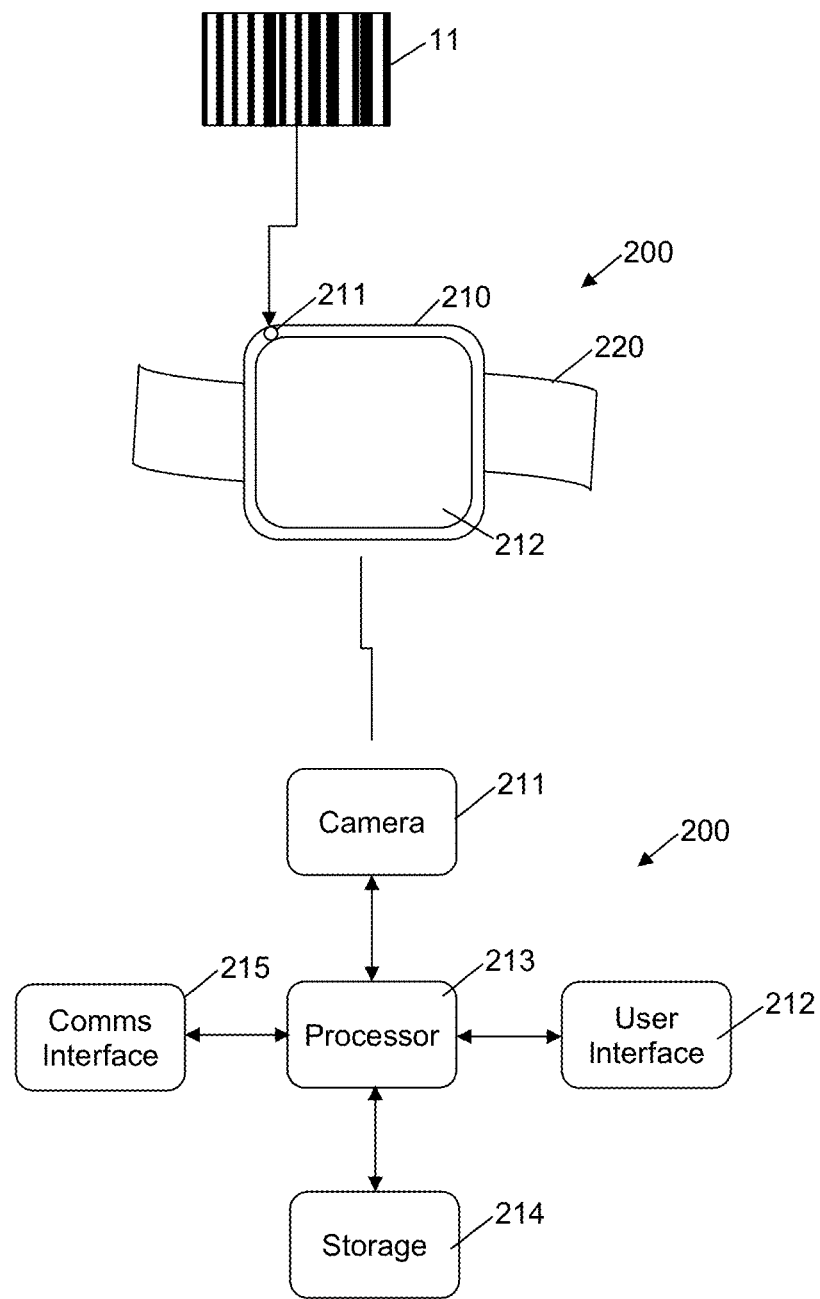
FIG. 2 is a schematic view of an example barcode scanner.

As shown in FIG. 2, the scanner device 200 has the form factor of a wrist watch. The scanner device 200 includes a main body 210 and a strap 220 to secure the main body to the wrist of the user. In this wrist-worn configuration the scanner device 200 has a size, shape and weight which is convenient to be worn by the user during their working day. Conveniently, being wrist worn, the user always carries the scanner 200 about their person ready for use. The scanner 200 is not easily mislaid or forgotten whilst moving around the retail store. The scanner device 200 is configured to be worn by the user while in use and the user may operate the scanner 200 while it is worn on their wrist.

In this example, the main housing 210 is provided with at least one camera 211 and a display screen 212. In the example embodiment, the display screen 212 is conveniently a touch-screen which both outputs images on the screen to be seen by the user and receives touch inputs of the user onto the screen. Other user interface components may also be provided, such as one or more buttons on the housing 210 to receive user inputs.

Internally, the housing 210 suitably contains a battery power source, and computing hardware including at least a processor 213 and a storage device 214 such as a non-volatile memory, as illustrated schematically in FIG. 2. A communications interface 215 may be provided which allows the scanner 200 to communicate wirelessly over the local network 31 of FIG. 1. In one example, the communications interface 215 includes a Wi-Fi interface. In another example the communications interface 215 provides a cellular data interface such as a 2G, 3G or 4G cellular telephone network interface. As a further example, the communications interface 215 may include a close-range communication interface such as a Bluetooth interface.

Figure 3:
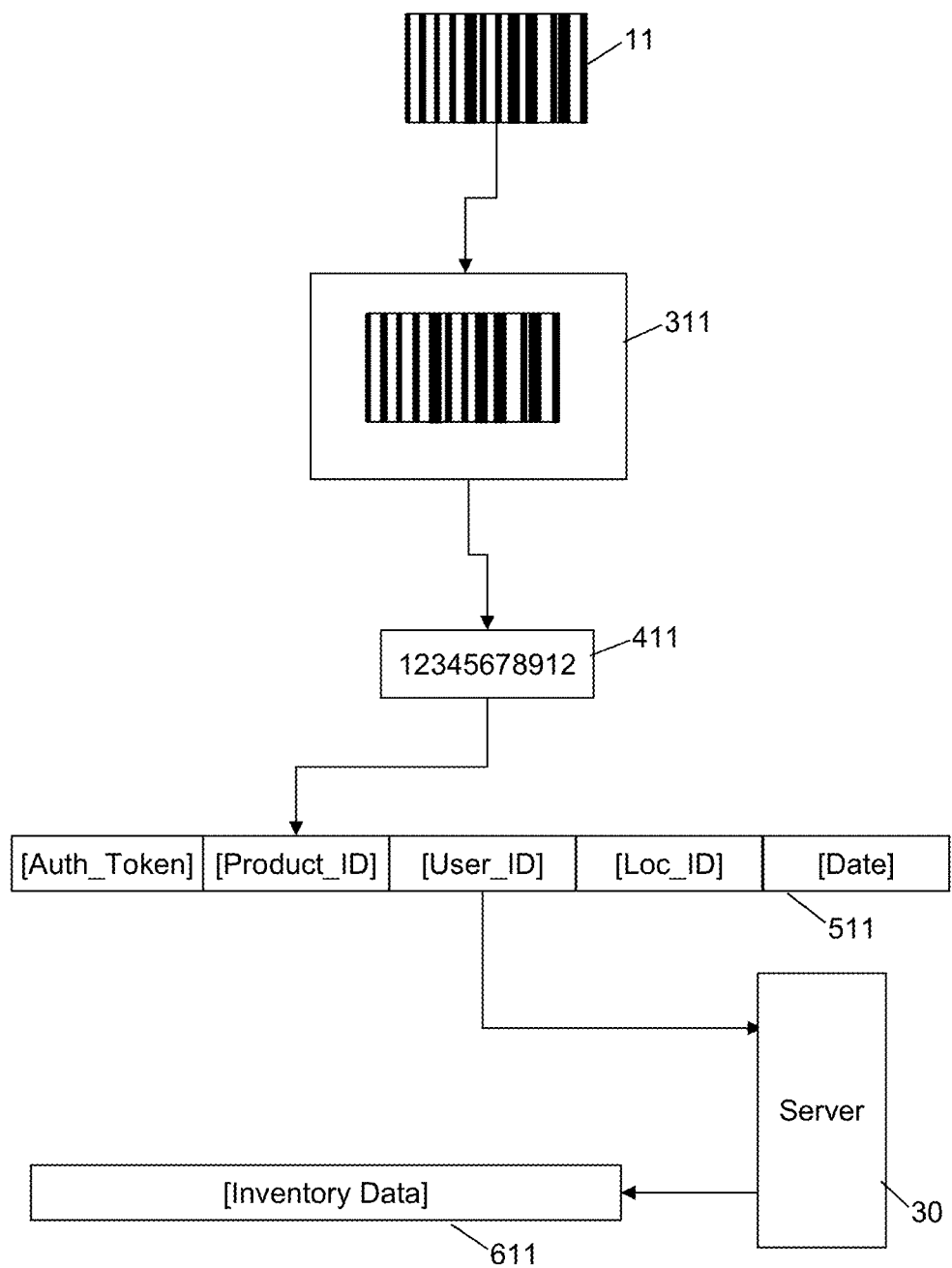
FIG. 3 is a schematic diagram of the barcode scanner in use.

FIG. 3 is a schematic diagram showing an example flow of information within the example inventory system. The barcode label 11 is scanned by the scanning device 200 as described above. Conveniently, the camera 211 captures an image 311 which contains the barcode label 11. The barcode label 11 is identified within the image and decoded to provide the barcode payload data, which in this case comprises a product identity code 411. The scanner 200 may create a request message 511 comprising, as in this example, a plurality of fields. These fields of the request message 511 may include an authorisation token which confirms that the scanner device is authorised to make the request. The request message 511 may include the product identity 411 as derived from the barcode label 11. The request message 511 may include parameters such as a user identity of a member of staff who currently uses the scanner 200, and a location identity associating the scanner with a particular retail store. The request message 511 may include a date/time code appropriate to a time of the request. One or more other fields may also be included within the message 511 as appropriate in other particular implementations.

In use, the local store server 30 receives the inventory request message 511 and performs an appropriate lookup of inventory data, such as by interrogating the inventory database 32. As noted above, the inventory database may be very large and may change frequently, whereas the user requires access to a selected subset of the data which is relevant to the product item of interest as identified by the barcode 11. The server 30 may prepare an inventory data message 611 comprising inventory data obtained in response to the received inventory request message 511. The inventory data message may be communicated to the scanner 200 via one or more of the local communications links 31 noted above. In this way, the scanner 200 may function as a portable data terminal. The inventory data 611 may be used by the scanner 200 to prepare a user output to be displayed on the display 212. Further interactions may then continue on the scanner 200 wherein the user may interact with the scanner 200 to study and interact with the received inventory data 611. In one example, the user may then cause the device 200 to make further requests to the server 30, e.g. to request an action in relation to the current data, or to request data for another item.

Figure 4:
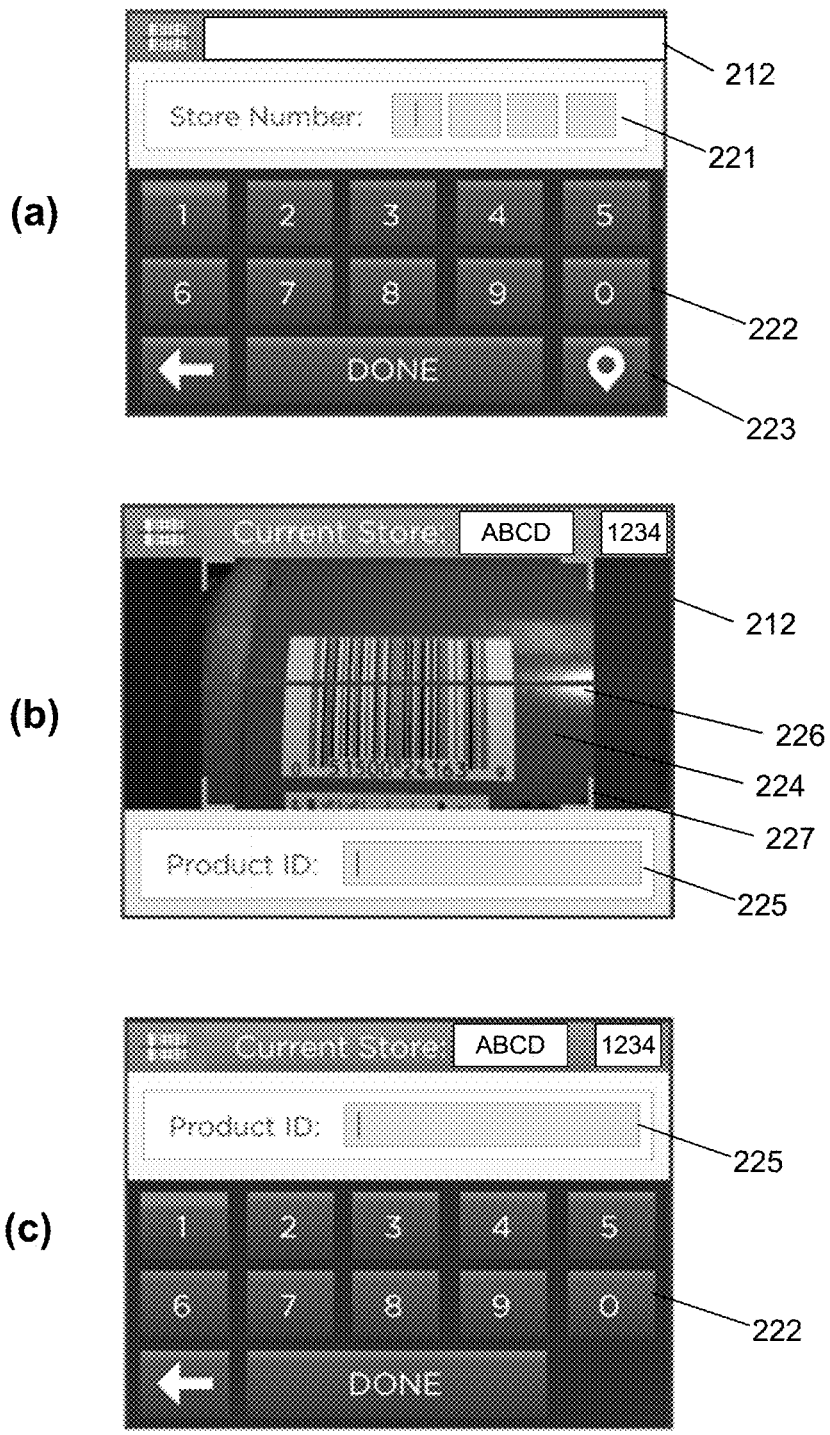
FIG. 4 is a schematic view of an example user interface of the barcode scanner.

FIG. 4 shows a sequence of example user interface screens that may be displayed on the display 212 of the wrist-worn barcode scanner device 200. In a set-up phase, a first user interface screen may prompt a user to enter their credentials for authorisation and authentication of the user. For example, the device 200 may prompt the user to enter their user name and password in order to log in to the device. Also, the user may be prompted to enter a location of the scanner 200, and an appropriate user interface screen is then displayed as illustrated in picture (a) of FIG. 4. The user may enter, for example, a store number which identifies their location. A retailer with many stores conveniently identifies each store with a store number. The device 200 may present a dialogue box 221 together with a keypad 222 on the touchscreen display 212. Alternatively, in some examples, the scanner 200 may comprise a geolocation function, such as an internal GPS unit. In which case, location of the scanner 200 can be determined using the geolocation function. In this example, the user interface presents a location key 223 which causes the scanner 200 to determine the current geographical location and in turn determine an appropriate location identity, which in this example is the store number. Thus, having set the current geographic location or store number, the product inventory data 611 can be provided which is relevant to that particular store location. For example, products in one store may have a different price or stock level compared with the same products in another store. Once determined, the current location can remain fixed in the storage of the scanner 200 until an update or reset is needed, or a change of location is instructed by the user. Notably, this initial set up phase is relatively simple and lightweight. Even a relative inexperienced user is able to quickly and conveniently begin using the wrist-worn scanner 200.

In use, the most commonly required function of the scanner 200 is to scan the barcode labels 11. Hence, a scanner function is suitably directly accessible from a home screen of the device 200. In one example, the device 200 provides a home screen while at rest and transitions to a scanning mode in response to selecting a scanner icon on the home screen. The picture (b) in FIG. 4 illustrates the scanner 200 whilst in use to perform the scanning function, as noted by the scanner icon in the upper left. As shown in FIG. 4, the display 212 may define a region 224 to display a live image as captured by the camera 211. Thus, the user has clear and immediate visual feedback that the camera 211 is oriented toward the desired barcode label 11. In one example, the scanner 200 may capture the barcode as soon as an appropriate image is visible. In another example, the scanner 200 may first indicate to the user that barcode capture is possible, such as by changing a visual output on the display 212. For example, one or more corner marker regions 227 which surround the image region 224 may change colour to visually indicate to the user that a satisfactory image is in view. Other forms of visible or audible indications are also possible. In one example, the user may then actively trigger processing of that image, such as by touching the touchscreen 212. In this way, the user has clear and accurate visual feedback concerning the image capture and barcode scanning process, while also maintaining accurate control of the device 200.

In one example, the live stream of camera images may be simply viewed and then discarded if not otherwise used. In another example, one or more camera images may be selectively saved in a memory of the scanner device 200 to be available for later analysis. In one example mode, the user can quickly capture several individual images which are gathered together and then later processed or analysed by the scanner device 200, or uploaded to be processed and analysed elsewhere such as on the server 30. Notably, this improved image capture interface allows several images to be captured quickly and conveniently, such as while performing a stock-check or inventory counting process.

As further illustrated in FIG. 4, the image capture user interface may further include a guide portion 226 which allows the user to correctly orient and position the scanner 200 in relation to the barcode 11. In this example, the guide 226 is a linear graphical element which extends horizontally across the image region 224 and indicates to the user that the barcode 11 should appear substantially parallel to and intersecting with this guideline within the captured image.

In this example, the user interface may further include a dialogue box 225 which allows the user to manually enter the payload data from the barcode image. The barcode label 11 may present a product identity in human-readable form alongside the machine-readable data. The human readable characters (e.g. "5150024163") can be input by the user to the dialogue box 225. Touching the dialogue box 225 may cause the display 212 to transition from the image capture mode (b) to the numerical entry mode (c) which makes available the displayed numerical keyboard 222. This keypad entry function ensures that a satisfactory product identity may be input even if for some reason the camera image capture is not satisfactory.

Figure 5:
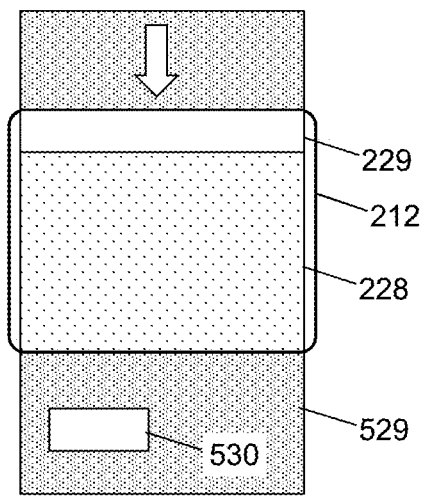
FIG. 5 is a further schematic view of an example user interface of the barcode scanner.

FIG. 5 is a schematic view of an example user interface when the device 200 is in a data display mode which displays the inventory data 611 on the display 212. As noted above, the inventory data 611 may be received by the scanner 200 such as from a local store server 30 and thus contains information for the user relevant to the identified product as on sale within this particular store. For example, the product inventory data may include details of the relevant product item itself such as price, weight, quantity, product name, manufacturer, supplier etc. Further the product inventory data 611 may include management information relevant to the product within this particular retail store such as the stock levels on hand, in reserve in a warehouse, in transit to the store, and so on. Further, the management information may include status information such as when stock will next be replenished, the maximum number of items likely to be held in stock at any one time, and so forth. The inventory data may further include sales analysis data, such as the date and time of the last sale and the daily or weekly sales figures. It will be appreciated that the product inventory data may involve a relatively large data set and as such there is a difficulty in enabling the user to access all of the relevant data in a small and portable device.

FIG. 5 shows the physical display screen 212 which in use suitably defines an active display region 228 in which the inventory data 611 is to be displayed. Further, the display screen 212 may include one or more static regions 229 which, for example, provide menu controls allowing the user to select other functions of the device or to change between different display modes, wherein each mode provides a different view of some or all of the inventory data 611.

Figure 6:
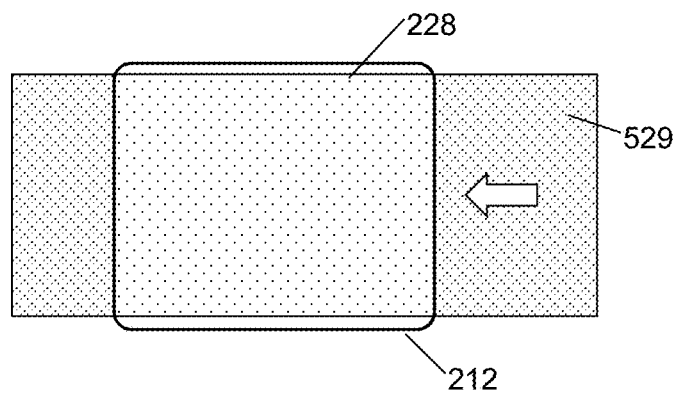
FIG. 6 is a further schematic view of the user interface of the barcode scanner.

In this example, the scanner 200 defines a data field 529 which is larger than the active display region 228 available on the display 212. Thus, the active display region 228 defines a window within which a portion of the defined data field 529 is displayed. As a result, the user may scroll the active window 228 across the display field 529, allowing the user to easily and intuitively access a large set of data using only a small display screen. In the example in FIG. 5, the inventory data field 529 may appear to scroll vertically within the active window 528. As another example, the active region 228 may appear to scroll horizontally in relation to the display field 529, as in FIG. 6. In a further example, the inventory data field 529 may extend both horizontally and vertically in relation to the active display window 228.

In one example, the data field 529 may define one or more user selectable regions 530 which when present in the active window 228 and activated by the user cause the display to enter a user input mode in which the user can actively enter data into the displayed field 530. Here, the user may touch the editable region 530 which causes the display then to show an input window 225 with a keyboard 222 such as in FIG. 4.

Figure 7:
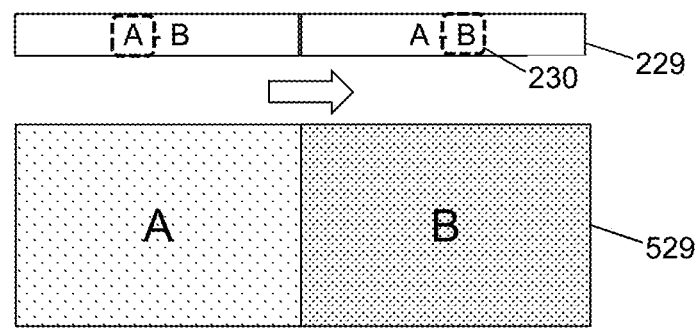
FIG. 7 is a further schematic view of the user interface of the barcode scanner.

As shown in FIG. 7, the displayed field 529 may be subdivided into screen sized sub-regions, here illustrated as regions A and B, and the user may transition between screen sub-regions A and B such as by a touch-scrolling mechanism. The field 529 may be biased to rest in a position wherein one of the regions A or B is displayed. Thus the user readily appreciates that one or more further screens of information are available and easily and intuitively explores the full extent of the available product inventory data 611 even though the screen is of a relatively small size. As also shown in FIG. 7, the static region 229 may indicate which of the sub-regions is currently displayed. In this example, the static region 229 functions as an index which lists or otherwise indicates the available sub-regions A, B and highlights the currently displayed sub region A or B accordingly such as by a moving highlight element 230. Again, the scanner 200 indicates to the user that further data is available to be displayed and guides the user to better navigate around the displayable data.

Figure 8:
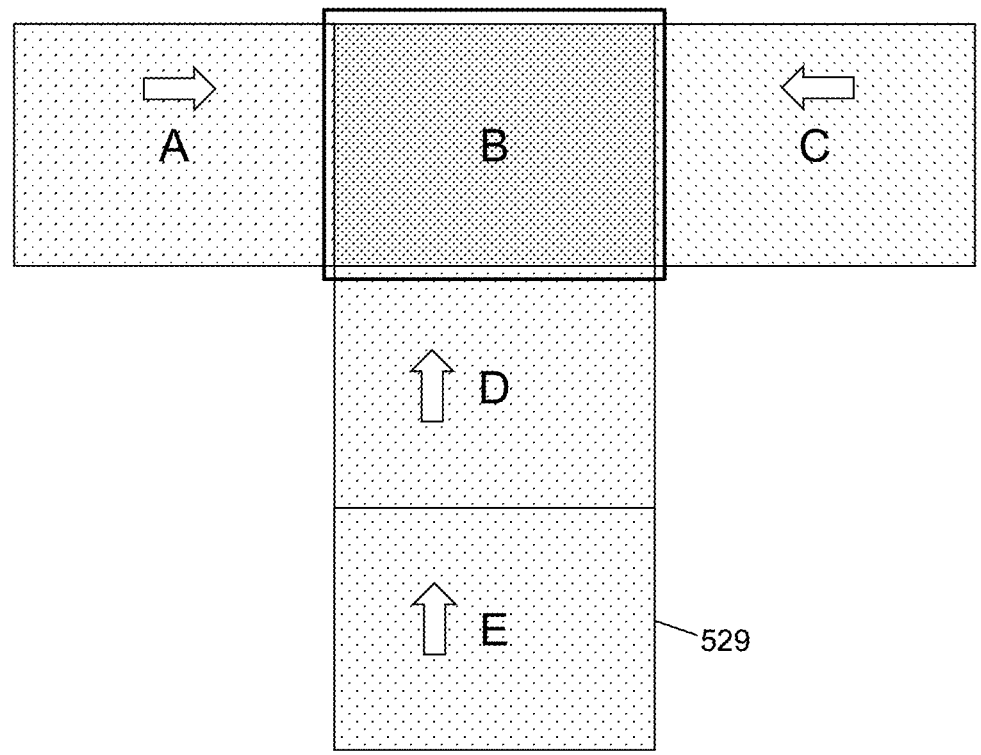
FIG. 8 is a further schematic view of the user interface of the barcode scanner.

As shown in FIG. 8, further sub-regions (e.g. C, D, E) may extend in any suitable direction from the initial illustrated sub-regions A, B, again allowing the user to easily traverse over plural sub-regions in sequence. Each such sub-region of the data field 529 may link to one or more other adjacent sub-regions. Each sub-region 529A, 529B, etc. is suitably rectangular in shape and is joined to its adjacent sub-regions in horizontal and/or vertical directions. Thus, the data field 529 is assembled from a plurality of sub-regions each of which is sized to approximate the displayable window 228 on the display 212. In this example, one such sub-region 529B is in focus on the display at any one time and user may transition to the indicated adjacent sub-regions 529A, 529C, 529D such as by a scrolling action. Moving to one such adjacent sub-region 529D then makes available a further sub-region 529E, as illustrated in this example. In one example, the active display window 228 may smoothly transition between the adjacent sub-regions, thus incrementally bringing the next sub-region into view. One or more of the sub-regions 529A,B may be sized smaller than an integer increment of the active display window 228. For example, the data field 529 may be defined which is one and a half times the vertical (or horizontal) extent of the active display window 228.

Figure 9:
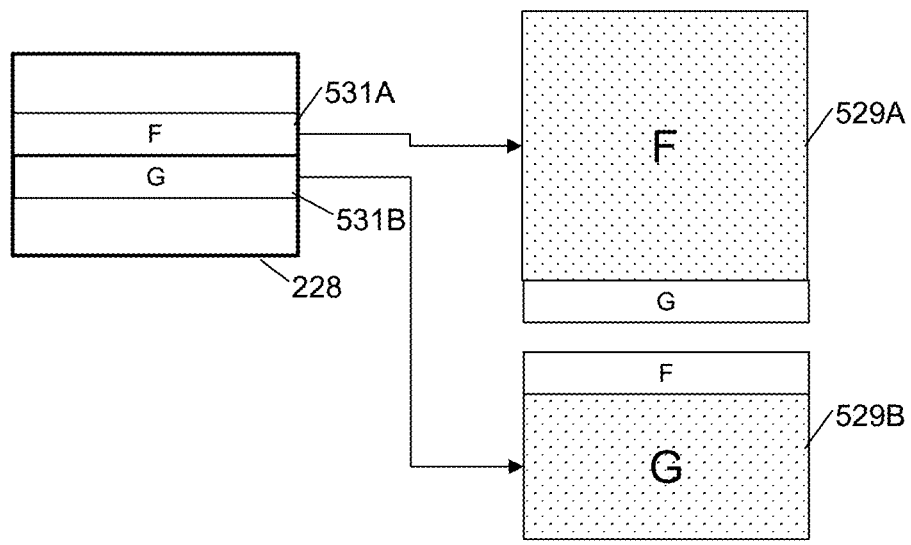
FIG. 9 is a further schematic view of an example user interface of the barcode scanner.

FIG. 9 shows a further example in which one or more expandable portions 531 of the data field 529 viewable within the active display window 228 are provided in a form which allows a transition between collapsed and expanded states according to selections of a user. In this example, two such expandable data portions 531F & 531G are provided initially in a collapsed state. These data portions 531 may be embedded at any suitable position in the initial data field 529 and may be set initially to a collapsed or expanded state. Upon selection by the user, such as by touching this area of the touch screen 212, these data portions toggle to expand or collapse as appropriate. In their expanded state, these data portions 531 may form sub-regions 529A, 529B of the type discussed herein. In one example, these data portions 531 are independently controllable by the user with the state of each portion independent of the state of any other such portion. Further, such expandable data portions 531 may be provided at any suitable positions within the data field 529, beyond those illustrated, as will be appreciated from the discussion herein.

Although a few preferred embodiments have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

The invention claimed is:

1. A barcode scanner device, comprising:
a main body including:
a camera to capture an image of a barcode,
a processor to process the image and decode a payload of the barcode, wherein the processor is arranged to decode a product identity code in the payload of the barcode by processing the image captured by the camera,
a communication interface to send an inventory request message based on the product identity code in the payload of the barcode and to receive inventory data in response thereto; and
a strap arranged to secure the main body in use to a wrist of a user;
wherein the barcode scanner device is operable to scan the barcode while secured to the user's wrist by the strap;
wherein the barcode scanner device is operable to determine a current geographical location of the barcode scanner device and to set a location identity of the barcode scanner device, associating the barcode scanner device with a particular retail store, according to the determined current geographical location, and
wherein the inventory request message sent by the communication interface comprises the product identity code derived from the barcode, a user identity of a member of staff who currently uses the barcode scanner device, and the location identity associating the barcode scanner device with the particular retail store.

2. The barcode scanner device of claim 1, wherein the scanner device is formed as a wrist watch.

3. The barcode scanner device of claim 1, wherein the main body further comprises a touch-screen display which both displays information on a display screen and receives a user input by touching the display screen.

4. The barcode scanner device of claim 1, wherein the communication unit is arranged to send the inventory request message containing the product identity code to a server over a wireless communication channel and receive in response an inventory data message comprising the inventory data relevant to the product identity code.

5. The barcode scanner device of claim 1, wherein the inventory request message further comprises an authorization token which confirms that the scanner device is authorized to make the request.

6. The barcode scanner device of claim 1, further comprising:
a global positioning system (GPS) configured to determine the current geographical location of the scanner device;

wherein the scanner device is configured to set the location identity of the scanner device according to the determined current geographical location.

7. The barcode scanner device of claim 3, wherein the scanner device is arranged to display the inventory data on the display screen and to receive a user input relevant to the displayed inventory data by touching the display screen.

8. The barcode scanner device of claim 3, wherein the scanner device is arranged to display a home screen while at rest and to transition to a scanning mode in response to selecting a scanner function on the home screen.

9. The barcode scanner device of claim 3, wherein the scanner device is arranged to display in a region of the display screen a live camera image as captured by the camera to aid orientation of the scanner device by the user.

10. The barcode scanner device of claim 9, wherein the scanner device is arranged to provide a visible indication to the user that capture of the barcode is possible from the live camera image displayed on the display screen.

11. The barcode scanner device of claim 9, wherein the scanner device is arranged to display a guide portion on the display screen to guide a correct orientation and position the scanner device in relation to the barcode.

12. The barcode scanner device of claim 3, wherein the scanner device is arranged to trigger processing of the barcode in the camera image in response to a user touch input on the display screen.

13. The barcode scanner device of claim 1, wherein the scanner device is arranged to capture and store a plurality of camera images from the camera to be processed at a later time.

14. The barcode scanner device of claim 1, wherein the scanner device further comprises a display screen arranged to display inventory data related to the barcode, wherein the display screen provides an active display window and the inventory data is arranged in a data field extending beyond the active display window.

15. The barcode scanner device of claim 14, wherein the data field of the inventory data extends beyond the active display window horizontally and/or vertically and the scanner device is arranged to access the inventory data by scrolling the active display window over the data field.

16. The barcode scanner device of claim 15, wherein the data field is divided into a plurality of adjacent sub-regions each approximate in size to the active display window, and wherein the scanner device is operable to transition between a first one of said sub-regions and an adjacent second one of said sub-region by scrolling the active display window respectively therebetween.

17. The barcode scanner device of claim 14, wherein the data field defines one or more user selectable regions which when present in the active display window and activated by the user cause the display screen to enter a user input mode in which the user can actively enter data into the displayed field.

18. An inventory management system for managing inventory in a retail store, comprising:
    a local server device coupled to a product inventory data storage device containing inventory data related to a plurality of product items;
    a local communication interface for wireless communication with the local server device; and
    a barcode scanner device comprising a main body and a strap to secure the main body in use to a wrist of a user, the barcode scanner device including a camera to capture an image of a barcode on a product item, a communication interface to send an inventory request message based on the barcode to the local server device and to receive inventory data in response thereto, and a touch-screen display to display the received inventory data while receiving user touch inputs,
    wherein the barcode scanner device is operable to determine a current geographical location of the barcode scanner device and to set a location identity of the barcode scanner device, associating the scanner device with a particular retail store, according to the determined current geographical location, and
    wherein the inventory request message sent by the barcode scanner device comprises the product identity code derived from the barcode, a user identity of a member of staff who currently uses the barcode scanner device, and the location identity associating the barcode scanner device with the particular retail store.

19. The inventory management system of claim 18, wherein the barcode scanner device is formed as a wrist watch.

20. The inventory management system of claim 18, wherein the local server device is coupled to a computer network to exchange updates of the product inventory data held in the product inventory data storage device.

* * * * *